US010262403B2

(12) United States Patent
Kim et al.

(10) Patent No.: US 10,262,403 B2
(45) Date of Patent: Apr. 16, 2019

(54) APPARATUS AND METHOD FOR IMAGE NAVIGATION AND REGISTRATION OF GEOSTATIONARY REMOTE SENSING SATELLITES

(71) Applicant: Korea Aerospace Research Institute, Daejeon (KR)

(72) Inventors: Handol Kim, Seoul (KR); Ahmed Kamel, Los Altos, CA (US); Dochul Yang, Daejeon (KR); Chulmin Park, Daejeon (KR); Jin Woo, Chungcheongbuk-do (KR)

(73) Assignee: Korea Aerospace Research Institute, Daejeon (KR)

( * ) Notice: Subject to any disclaimer, the term of this patent is extended or adjusted under 35 U.S.C. 154(b) by 17 days.

(21) Appl. No.: 15/495,228

(22) Filed: Apr. 24, 2017

(65) Prior Publication Data

US 2018/0308226 A1 Oct. 25, 2018

(51) Int. Cl.
*G06T 5/20* (2006.01)
*B64G 1/10* (2006.01)
*G01C 21/24* (2006.01)

(52) U.S. Cl.
CPC .............. *G06T 5/20* (2013.01); *B64G 1/1021* (2013.01); *G01C 21/24* (2013.01); *B64G 2001/1028* (2013.01); *G06T 2207/20024* (2013.01)

(58) Field of Classification Search
CPC ............ G06T 5/20; G06T 2207/20024; G01C 21/24; B64G 1/1021; B64G 2001/1028
USPC .......................................................... 382/260
See application file for complete search history.

(56) References Cited

U.S. PATENT DOCUMENTS

2011/0196550 A1* 8/2011 Carrico, Jr. ............ B64G 1/242
701/13
2012/0078510 A1* 3/2012 Ma ....................... G01C 21/165
701/426

\* cited by examiner

*Primary Examiner* — Amandeep Saini
(74) *Attorney, Agent, or Firm* — Downs Rachlin Martin PLLC

(57) ABSTRACT

Provided is an apparatus for geometrically correcting an image from a geostationary remote sensing satellite, the apparatus being configured to perform the image navigation and registration on image data from a geostationary remote sensing satellite. The apparatus includes the landmark determination part configured to acquire landmark information associated with a first image and the navigation filter configured to calculate a state vector for correcting at least one of the attitude error, the orbit error, and the payload misalignment error with respect to the first image based on the landmark information.

17 Claims, 8 Drawing Sheets

APPARATUS AND METHOD FOR IMAGE NAVIGATION AND REGISTRATION OF GEOSTATIONARY REMOTE SENSING SATELLITES

TECHNICAL FIELD

The following descriptions relate to technology for performing image navigation and registration on image data from a geostationary remote sensing satellite and, more particularly, to a method of correcting a geometric distortion in an image from a geostationary remote sensing satellite based on landmark information.

BACKGROUND ART

In general, an observation satellite, or a remote sensing satellite, located on the geostationary orbit may employ the image navigation and registration (INR) scheme to correct a geometric distortion in a satellite image for providing accurate observation information. A satellite INR system may model an error-caused process with respect to a pixel position in an image and correct the error such that the error is maintained to be within an allowable range. For example, the attitude, orbit, and satellite payload misalignment errors may be the source of the errors and the targets to be corrected.

In the INR system, the reference point selection may affect the overall system configuration, the design of interfaces between the subsystems, and various other aspects such as the developmental composition, costs, a future operation plan, and the like. When the INR system for geostationary orbital 3-axis satellite was first developed in the early 1990s, the initial INR system has employed the reference points composed of both landmarks and stars (GOES-I to M satellites in the US). This INR system using the combination of the landmarks and the starts has been continually applied to GOES-N to P in the US and MASAT-1R in Japan. As the reference point used for geometric correction, the landmark is sensitive to both the orbit and the attitude of a satellite and thus, may be useful for correcting both the orbit and the attitude. In contrast, the star is sensitive to only the attitude of the satellite and thus, may be useful for correcting the attitude. Prior to the era when the landmark acquisition process was automated, it has depended on a manual operation by an operator and thus, the number of effective landmarks that could be used in a single processing was relatively small. For this reason, all available reference points may have been secured and used to increase accuracy in the correction. Also, to meet the requirement of a less than three minutes processing time delay or product latency, the correction may have been processed on board by directly moving the mirror inside of the on-board instrument (camera). In order to generate correction information for this purpose, all of the available reference points may have been secured and used. As for the star sensing method, to avoid the burden of paying royalties for the international patent, among other reasons, an INR system that uses landmarks without star sensing has been developed for, for example, the COMS satellite in Korea and the MTSAT-2 satellite in Japan.

In the US, for the GOES-R satellite following the GOES-P satellite the INR system that uses an on-board global positioning system (GPS) for the orbit estimation and determination has been designed and developed. Through this, a star-based INR system has been provided, instead of the INR system that uses the combination between the landmark and the star, which had been adopted in the previous GOES satellite heritage system. However, the star-based INR system has become available in the GOES-R satellite because the orbit determination system using the on-board GPS provides estimated orbit information with high accuracy. Therefore, there exists a certain limit in choosing and using the INR system that adopts only the star sensing for most geostationary remote sensing satellites.

DISCLOSURE OF INVENTION

Technical Solutions

According to an aspect, an apparatus is provided for performing the geometric correction to the image taken by a geostationary remote sensing satellite, the apparatus including a landmark determination part configured to acquire landmark information associated with a first image, and a navigation filter configured to calculate a state vector for correcting at least one of the attitude error, the orbit error, and the payload misalignment error with respect to the first image based on the landmark information.

According to an example embodiment, the landmark determination part may be configured to select a first position of at least one landmark from the first image, calculate a difference between the selected first position and a second position, and acquire the landmark information based on the result of this calculation, the second position being an actual landmark position corresponding to the first position.

According to an example embodiment, the apparatus may further include a preprocessor configured to generate the first image by performing a radiometric calibration on an image received from a geostationary remote sensing satellite.

According to an example embodiment, the navigation filter may be configured to calculate the state vector using a Kalman filter algorithm.

When the orbit information is provided as an input from an outside source, the navigation filter may be configured to additionally refine the orbit information using Kalman filter orbit information that is calculated based on the landmark information, and calculate the state vector including the additionally refined orbit information.

Also, even when the orbit information is not provided as an input from an outside source, the navigation filter may be configured to estimate the orbit information in itself associated with the first image using Kalman filter orbit information that is calculated based on the landmark information, and calculate the state vector including the estimated orbit information.

According to an example embodiment, the apparatus may further include a resampler configured to resample pixel positions of the first image based on the calculated state vector.

According to another aspect, a method is also provided for geometrically correcting an image from a geostationary remote sensing satellite, the method including acquisition of landmark information associated with a first image, and calculating a state vector for correcting at least one of the attitude error, the orbit error, and the payload misalignment error with respect to the first image based on the landmark information.

According to an example embodiment, the method may further include preprocessing for generating the first image by performing a radiometric calibration on an image received from a geostationary remote sensing satellite.

According to an example embodiment, the acquisition of the landmark information may include selecting a first position of at least one landmark from the first image, calculating a difference between the selected first position and a second position, and acquisition of the landmark information based on a result of the calculating, the second position being an actual landmark position corresponding to the first position.

According to an example embodiment, when the orbit information is an input from an outside source, the calculating of the state vector may include additionally refining the orbit information using Kalman filter orbit information that is calculated based on the landmark information and calculating the state vector including the additionally refined orbit information.

Also, when the orbit information is not an input from an outside source, the calculating of the state vector may include estimating orbit information associated with the first image using Kalman filter orbit information that is calculated based on the landmark information and calculating the state vector including the estimated orbit information.

The calculating of the state vector may include calculating the state vector using a Kalman filter algorithm.

According to an example embodiment, the method may further include resampling on the pixel positions of the first image based on the calculated state vector.

BEST MODE FOR CARRYING OUT THE INVENTION

Figure 1:
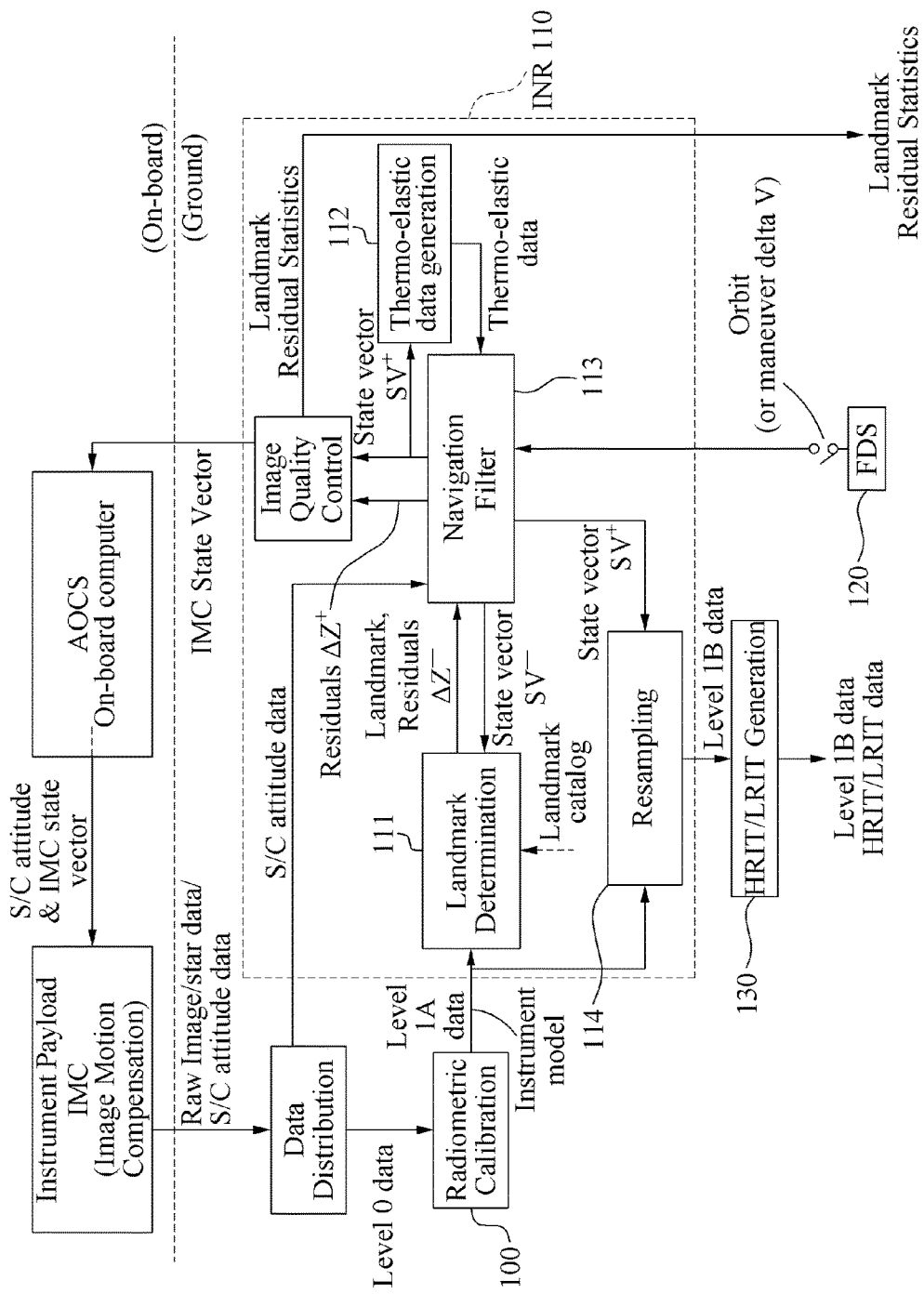
FIG. 1 is a diagram illustrating a structure of an image navigation and registration (INR) system and a configuration relationship in the INR system according to an example embodiment.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

The following specific structural or functional descriptions are examples to merely describe embodiments, and various alterations and modifications may be made to the examples. Here, the examples are not construed as limited to the disclosure and should be understood to include all changes, equivalents, and replacements within the idea and the technical scope of the disclosure.

Terms such as first, second, A, B, (a), (b), and the like may be used herein to describe components. Each of these terminologies is not used to define an essence, order or sequence of a corresponding component but used merely to distinguish the corresponding component from other component(s). For example, a first component may be referred to a second component, and similarly the second component may also be referred to as the first component.

It should be noted that if it is described in the specification that one component is "connected," "coupled," or "joined" to another component, a third component may be "connected," "coupled," and "joined" between the first and second components, although the first component may be directly connected, coupled or joined to the second component. In addition, it should be noted that if it is described in the specification that one component is "directly connected" or "directly joined" to another component, a third component may not be present therebetween. Likewise, expressions, for example, "between" and "immediately between" and "adjacent to" and "immediately adjacent to" may also be construed as described in the foregoing.

The terminology used herein is for the purpose of describing particular examples only, and is not to be used to limit the disclosure. As used herein, the terms "a," "an," and "the" are intended to include the plural forms as well, unless the context clearly indicates otherwise. As used herein, the terms "include, "comprise," and "have" specify the presence of stated features, numbers, operations, elements, components, and/or combinations thereof, but do not preclude the presence or addition of one or more other features, numbers, operations, elements, components, and/or combinations thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Hereinafter, reference will now be made in detail to examples with reference to the accompanying drawings, wherein like reference numerals refer to like elements throughout.

FIG. 1 is a diagram illustrating a structure of an image navigation and registration (INR) system and a configuration relationship in the INR system according to an example embodiment.

When raw data, S/C attitude data, and the like of an image observed from a geostationary remote sensing satellite above 36,000 km is distributed to a ground, a radiometric calibration may be performed to change the observed image into a physical quantity to be determinable by a human being. Level-1A data may be generated by performing the radiometric calibration on level-0 data of the row image received from a radiometric calibration module 100. An INR system 110 may perform the radiometric calibration on the generated level-1A data.

When level-1A data is input to the INR system 110, a landmark determination module 111 may select a landmark position from the level-1A data by referencing a landmark catalog, and determine an actual position corresponding to the selected landmark position. The landmark determination module 111 may compare the landmark position selected from the level-1A data to the actual landmark position and obtain landmarks residuals, for example, AZ-corresponding to a difference therebetween. A navigation filter 113 may set various parameter values to minimize the landmark residual, and calculate or estimate a state vector for correcting the attitude error, the orbit error, and the payload misalignment error of the level-1A data based on the set parameter values. When information on a landmark is absent, a premeasured state vector value may also be applicable.

When measuring the state vector, the navigation filter 113 may receive data on thermal deformation from a thermoelastic data generation unit 112, and calculate or estimate the state vector so as to minimize a misalignment error of a payload or a sensor due to the thermal deformation. In general, the navigation filter 113 may receive primary orbit information from an external source such as flight dynamics systems (FDS) 120 as an input. Also, the navigation filter 113 may receive the orbit information from an external source such as an airborne global positioning system (GPS). In this instance, when an accuracy of the orbit information received from the external source is relatively low, the navigation filter 113 may additionally refine the orbit information to be a high-accuracy orbit value. Furthermore, even when the orbit information is not provided from the external source such as the FDS 120 and the airborne GPS, the navigation filter 113 may autonomously estimate and determine the orbit information using landmark information on the level-1A data, and calculate the state vector including the orbit information. Thereafter, a resampling module 114 may generate level-1B data that is obtained by resampling at least one pixel position in the level-1A data, based on the calculated state vector.

The level-1B data generated in the INR system 110 may be converted into a form of high rate information transmission (HRIT) or low rate information transmission (LRIT) by a HRIT/LRIT generation module 130 so as to be provided.

Figure 2:
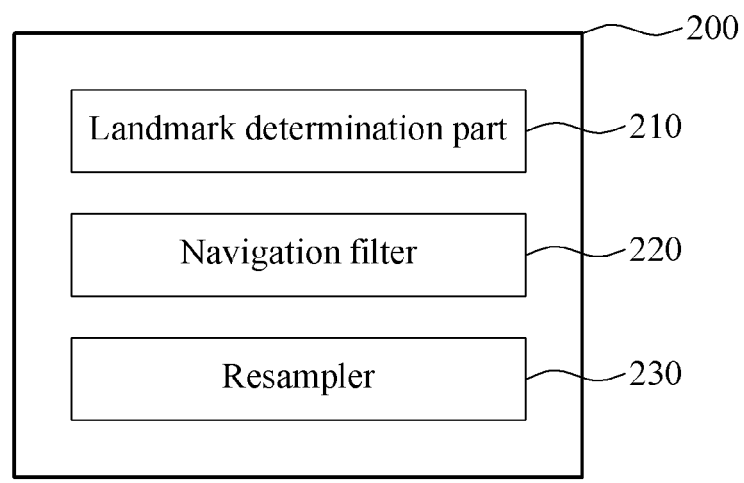
FIG. 2 is a block diagram illustrating an apparatus for geometrically correcting an image from a geostationary remote sensing satellite according to an example embodiment.

FIG. 2 is a block diagram illustrating an apparatus for geometrically correcting an image from a geostationary remote sensing satellite according to an example embodiment.

An apparatus 200 for geometrically correcting an image from a geostationary remote sensing satellite may perform a geometric correction, for example, INR, on an image captured from an observation satellite located on a stationary satellite and perform a method of correcting a geometric distortion in an image from a geostationary remote sensing satellite based on landmark information. The apparatus 200 may include a landmark determination part 210 and a navigation filter 220.

The landmark determination part 210 may acquire landmark information associated with a first image. The first image may be a level-1A image obtained by performing a radiometric calibration on a level-0 image received from a geostationary remote sensing satellite. The apparatus 200 may include a preprocessor (not shown) for the radiometric calibration to process the geometric correction of an observation satellite image.

The landmark determination part 210 may select a first position of at least one landmark from the first image, calculate a difference between the selected first position and a second position that is an actual landmark position corresponding to the first position, and acquire landmark information based on a calculation result. Here, the first position may be acquired by referencing a prestored landmark catalog.

The navigation filter 220 may calculate a state vector for correcting at least one of the attitude error, the orbit error, and the payload misalignment error with respect to the first image based on the landmark information acquired from the landmark determination part 210. The navigation filter 220 may calculate the state vector using a Kalman filter algorithm.

In a process of calculating the state vector, the navigation filter 220 may receive the orbit information associated with the first image from an external source such as an FDS and an airborne GPS. In this example, the navigation filter 220 may additionally refine the orbit information to be high-accuracy orbit information using Kalman filter orbit information calculated based on the landmark information. Furthermore, even when the orbit information is not input from the external element, the navigation filter 220 may autonomously estimate the orbit information associated with the first image using the calculated Kalman filter orbit information based on the landmark information, and calculate the state vector including the estimated orbit information. The calculated state vector may include correction information associated with an amount of correction to be performed on the first image in units of pixel.

Depending on examples, as an optional configuration, a resampler 230 may also be provided in the apparatus 200. The resampler 230 may resample at least one pixel position of the first image based on correction information of the state vector calculated in the navigation filter 220. Through such resampling, the first image may be corrected to be a level-1B-type image.

The apparatus 200 may use only the landmark information to correct the attitude, orbit, and payload misalignment errors of the satellite, which may cause a distortion in an image from the geostationary remote sensing satellite. When the accuracy of the orbit information received from the external source such as the FDS is relatively low, the apparatus 200 may additionally refine the received orbit information to be the high-accuracy orbit information. Also, even when the orbit information is not received from the external source, a self-contained orbit determining function may be provided in the apparatus 200. As such, since the apparatus 200 may not require an external source for providing precise orbit information, a system construction may be simplified and development costs may also be reduced. Furthermore, operational efficiency may be improved through a system simplification.

Figure 3:
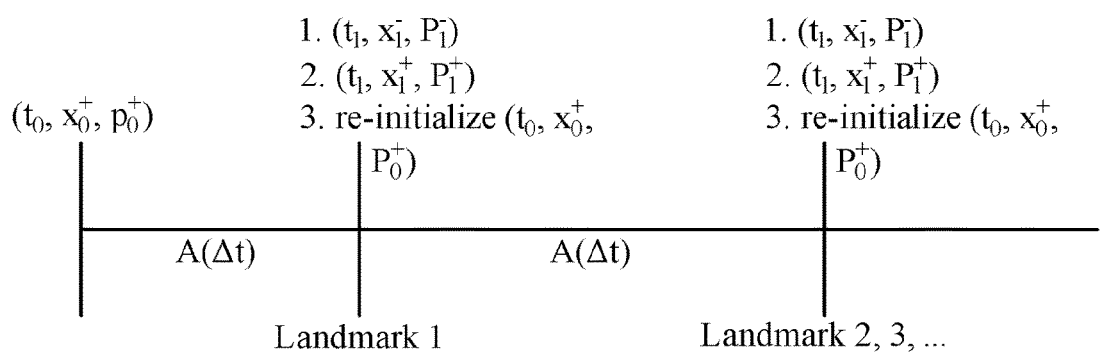
FIG. 3 is a diagram illustrating a principle of a Kalman filter data processing which is a core of satellite image geometric correction according to an example embodiment.

FIG. 3 is a diagram illustrating a principle of a Kalman filter data processing which is a core of satellite image geometric correction according to an example embodiment.

An apparatus for geometrically correcting an image from a geostationary remote sensing satellite may be designed and configured to process a geometric correction on an image received from the geostationary remote sensing satellite based on a Kalman filter scheme in a process of estimating a state vector. FIG. 3 illustrates a operational flow of a Kalman filter with respect to a basic INR method. A Kalman filter may use a single landmark at a single time to determine an optimal posteriori state vector and a covariance matrix estimation $(x_1^+, P_1^+)$. The Kalman filter may be re-initialized to perform propagation between $t_0$ and $t_1$ and perform estimation at $t_1$. Specifically, the Kalman filter may perform a 3-step process as follows.

In a step 1, a priori state vector and a covariance matrix $(x_1^-, P_1^-)$ may be obtained using an error matrix $Q(\Delta t)$ obtained from a system model and a state transition matrix $A(\Delta t)$, for example, $\Delta t = t_1 - t_0$ based on $(Xo+, Po+)$. The step 1 may be a propagation of covariance matrix P and a state vector (SV) between two consecutive landmarks.

$$x_1^- = A(\Delta t) x_0^+,$$

$$P_1^- = A(\Delta t) P_0^+ A(\Delta t)^T + Q(\Delta t) \qquad \text{[Equation 1]}$$

In a step 2, $(x_1^+, P_1^+)$ may be obtained based on $(x_1^-, P_1^-)$ and measurement models Z, H, and R. The step 2 may be an estimation of the state vector and the covariance matrix P at $t_1$. Kalman may be assumed that a relationship between $x_1^+$ and $x_1^-$ is defined in a form of a least squares method (LSM), and may be determined by associating a Kalman gain K and the covariance matrix P. This may be expressed using Equation 2 as below.

$$x_1^+ = x_1^- - K\Delta Z, \Delta Z = Z - \bar{Z}$$

$$K = P_1^- H^T (H P_1^- H^T + R)^{-1}$$

$$P_1^+ = (I-KH) P_1^- (I-KH)^T + KRK^T \quad \text{[Equation 2]}$$

In Equation 2, $(\Delta x_{corr}^+, \Delta x_{orb}^+, \Delta x_{ma}^+) \times (x_{corr}^+, x_{orb}^+, x_{ma}^+) = (x_{corr}^-, x_{orb}^-, x_{ma}^-)$ may be derived. This may occur a jump of a level-1B image at $t_1$, which may be prevented by replacing $(\dot{x}_{corr}^+, \dot{x}_{orb}^+, \dot{x}_{ma}^+)$ with $(\dot{x}_{corr}^+, \dot{x}_{orb}^+, \dot{x}_{ma}^+) + (\Delta x_{corr}^+, \Delta x_{orb}^+, \Delta x_{ma}^+)/\delta t$. Here, $\delta_t$ denotes a delta time until a subsequent landmark or a subsequent Kalman filter (KF) point, and may be set as $(x_{corr}^+, x_{orb}^+, x_{ma}^+) = (x_{corr}^-, x_{orb}^-, x_{ma}^-)$ at $t_1$ after an adjustment in gradient.

In a step 3, $(t_0, x_0^+, P_0^+) = (t_1, x_1^+, P_1^+)$ may be set to start a subsequent cycle from $t_0$ to $t_1$ such that the Kalman filter is re-initialized.

Figure 4A:
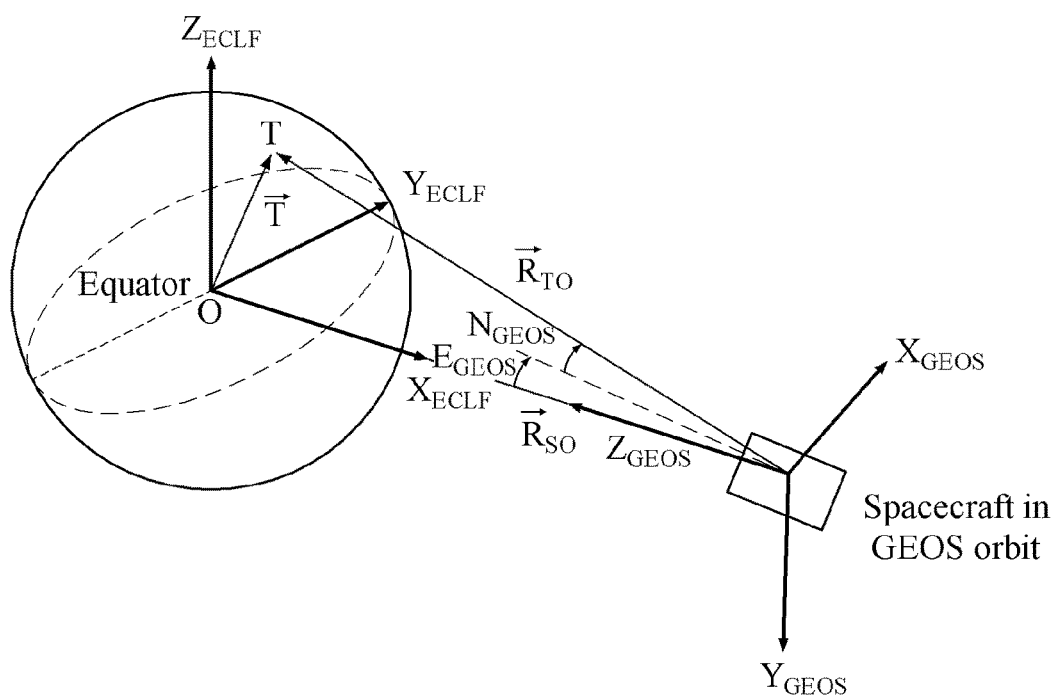
FIG. 4A and FIG. 4B are diagrams illustrating a scheme of landmark residual computation according to an example embodiment.
Figure 4B:
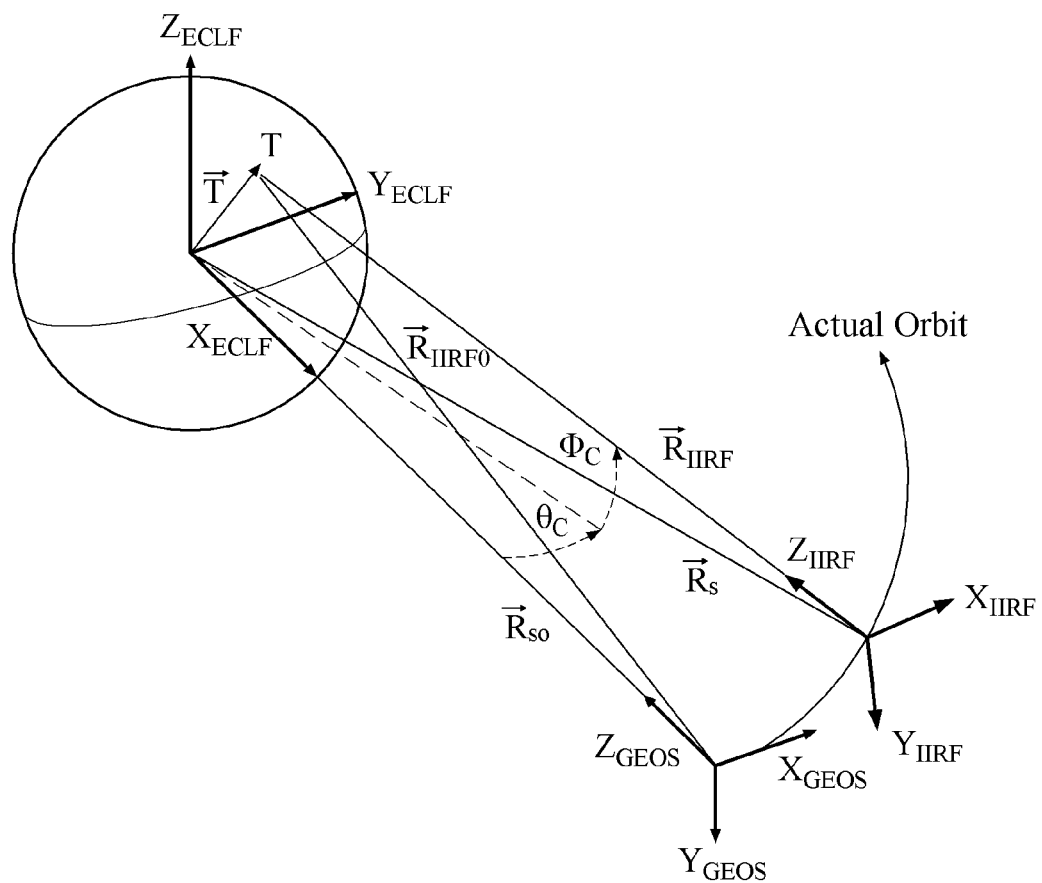

FIG. 4A and FIG. 4B are diagrams illustrating a scheme of landmark residual computation according to an example embodiment. FIG. 4A illustrates a scheme of converting a position of a landmark that actually measured from an earth centered local frame (ECLF) coordinate system into a fixed grid frame (GEOS) coordinate system, and FIG. 4B illustrates a GEOS coordinate conversion scheme of a landmark selected from a satellite image.

Landmark information used in a process of estimating a state vector to perform a geometric correction on a satellite image may be calculated based on landmarks residuals $\Delta Z$ that is a difference between a landmark position Z measured in the satellite image and an actual landmark position $\bar{Z}$ corresponding to the landmark position Z as expressed by Equation 3 below.

$$\Delta Z = Z - \bar{Z} \quad \text{[Equation 3]}$$

A scheme of acquiring the actual landmark position $\bar{Z}$ and converting the actual landmark position $\bar{Z}$ from the ECLF coordinate system to the GEOS coordinate system will be described with reference to FIG. 4A. Referring to FIG. 4A, Equation 4 may be acquired to obtain Equation 5 using a vector component in the GEOS coordinate system.

$$\vec{R}_{To} = \vec{T} - \vec{R}_{So} \quad \text{[Equation 4]}$$

$$\vec{R}_{To} = (R_e + h) \begin{bmatrix} C_{L_T} S_{\Delta\lambda_T} \\ -S_{L_T} \\ -C_{L_T} C_{\Delta\lambda_T} \end{bmatrix} - R_{So} \begin{bmatrix} 0 \\ 0 \\ -1 \end{bmatrix} \quad \text{[Equation 5]}$$

$$= R_{To} \begin{bmatrix} C_{\bar{N}_{GEOS}} S_{\bar{E}_{GEOS}} \\ -S_{\bar{N}_{GEOS}} \\ C_{\bar{N}_{GEOS}} C_{\bar{E}_{GEOS}} \end{bmatrix}$$

$$R_e = R_{eo}(1 + a S_{L_T}^2)^{-\frac{1}{2}} \cong R_{eo}(1 - f S_{L_T}^2)$$

$$\Delta\lambda_T = \lambda_T - \lambda_{so}, \quad a = (1-f)^{-2} - 1 \cong 2f$$

Also, by using Equation 4 and Equation 5, Equation 6 and Equation 7 may be obtained.

$$R_{To} = \sqrt{R_{so}^2 + (R_e + h)^2 - 2 R_{so} (R_e + h) C_{L_T} C_{\Delta\lambda_T}} \quad \text{[Equation 6]}$$

$$\bar{E}_{GEOS} = \text{Arc tan} \left[ \frac{(R_e + h) C_{L_T} S_{\Delta\lambda_T}}{R_{so} - (R_e + h) C_{L_T} C_{\Delta\lambda_T}} \right]$$

$$\bar{N}_{GEOS} = \text{Arc sin} \left[ \frac{(R_e + h) S_{L_T}}{R_{To}} \right]$$

$$\bar{Z} = \begin{bmatrix} \bar{E}_{GEOS} \\ \bar{N}_{GEOS} \end{bmatrix} \quad \text{[Equation 7]}$$

The landmark position measured in the satellite image may be obtained by converting coordinates $(E_{LRF}, N_{LRF})$ into coordinates $(E_{GEOS}, N_{GEOS})$ as described with reference to FIG. 4B. When using a single mirror instrument, Equation 8 may be satisfied.

$$E_{IIRF} = E_{LRF} - (\phi_{ma} S_{N_{LRF}} + \theta_{ma} C_{N_{LRF}})$$

$$N_{IIRF} = N_{LRF} - (\phi_{ma} C_{N_{LRF}} - \theta_{ma} S_{N_{LRF}}) / C_{E_{LRF}} \quad \text{[Equation 8]}$$

Here, $(E_{LRF}, N_{LRF})$ denotes the (EW, NS) angle of a landmark determined in an image. To obtain $(E_{LRF}, N_{LRF})$ from $(E_{IIRF}, N_{IIRF})$ for an inverse conversion, repetitive calculation may be performed twice according to Equation 8.

In the imager internal reference frame (IIRF) coordinate system, a component of unit vector $\hat{U}_{IIRF}$ may be acquired through a rotation of $E_{IIRF}$ relative to a new Y axis following a rotation of $N_{IIRF}$ relative to an X axis.

$$\hat{U}_{IIRF} = \begin{bmatrix} S_{E_{IIRF}} \\ -C_{E_{IIRF}} S_{N_{IIRF}} \\ C_{E_{IIRF}} C_{N_{IIRF}} \end{bmatrix} \quad \text{[Equation 9]}$$

Also, in the GEOS coordinate system, the component of unit vector $\hat{U}_{IIRF}$ may be given as expressed by Equation 10, and the inverse conversion may be performed using Equation 11.

$$\hat{R}_{IIRF} = C_{IIRF}^{GEOS} \hat{U}_{IIRF} = [\hat{R}_{GEOS,x}, \hat{R}_{GEOS,y}, \hat{R}_{GEOS,z}]^T \quad \text{[Equation 10]}$$

$$\hat{U}_{IIRF} = C_{GEOS}^{IIRF} \hat{R}_{IIRF}, C_{GEOS}^{IIRF} = [C_{IIRF}^{GEOS}]^T \quad \text{[Equation 11]}$$

A conversion from the IIRF coordinate system into the GEOS coordinate system may be performed using Equations 12, 13, and 14 as below.

$$C_{IIRF}^{GEOS} = \begin{bmatrix} C_\theta C_\psi - S_\theta S_\phi S_\psi & C_\theta S_\psi + S_\theta S_\phi C_\psi & -S_\theta C_\phi \\ -S_\psi C_\phi & C_\psi C_\phi & S_\phi \\ S_\theta C_\psi + C_\theta S_\phi S_\psi & S_\theta S_\psi - C_\theta S_\phi C_\psi & C_\phi C_\theta \end{bmatrix}_C$$

[Equation 12]

$$\cong \begin{bmatrix} 1 & \psi_C & -\theta_C \\ -\psi_C & 1 & \phi_C \\ \theta_C & -\phi_C & 1 \end{bmatrix}$$

$$SV_C = \begin{bmatrix} \phi_C \\ \theta_C \\ \psi_C \end{bmatrix} = SV_{ACF} + SV_{corr} \quad \text{[Equation 13]}$$

$$SV_{ACF} = SV_{ORF} + SV_{att}$$

-continued $$SV_{ACF} = \begin{bmatrix} \phi \\ \theta \\ \psi \end{bmatrix}, SV_{corr} = \begin{bmatrix} \phi_{corr} \\ \theta_{corr} \\ \psi_{corr} \end{bmatrix}$$ [Equation 14]

$$SV_{ORF} = \begin{bmatrix} \phi_{orb} \\ \theta_{orb} \\ \psi_{orb} \end{bmatrix}, SV_{att} = \begin{bmatrix} \phi_{att} \\ \theta_{att} \\ \psi_{att} \end{bmatrix}$$

Also, Equation 15 may be acquired using Equation 10 as illustrated in FIG. 4B, and Equation 16 may be acquired using Equation 15.

$$\vec{T} = \vec{R}_S + \vec{R}_{IIRF}$$ [Equation 15]

$$(R_e + h)\begin{bmatrix} C_{L_T}S_{\Delta\lambda_T} \\ -S_{L_T} \\ -C_{L_T}C_{\Delta\lambda_T} \end{bmatrix} =$$

$$R_s \begin{bmatrix} C_{L_s}S_{\Delta\lambda_s} \\ -S_{L_s} \\ -C_{L_s}C_{\Delta\lambda_s} \end{bmatrix} + R_{IIRF}\begin{bmatrix} \hat{R}_{GEOS,x} \\ \hat{R}_{GEOS,y} \\ \hat{R}_{GEOS,z} \end{bmatrix}$$

$$|\vec{T}| = |\vec{R}_S + \vec{R}_{IIRF}|$$ [Equation 16]

$$(R_e + h)^2 = R_{IIRF}^2 + R_S^2 + 2R_{IIRF}R_sC_{\alpha_s}$$

In this instance, $C_{\alpha_s}$ is a dot product of $\hat{R}_s$ and $\hat{R}_{IIRF}$ as expressed by Equation 17, which may be represented as shown Equation 18.

$$C_{\alpha_s} = \hat{R}_{GEOS,x}C_{L_s}S_{\Delta\lambda_s} - \hat{R}_{GEOS,y}S_{L_s} - \hat{R}_{GEOS,z}C_{L_s}C_{\Delta\lambda_s}$$ [Equation 17]

$$R_{IIRF} = R_s/r$$

$$r = \{C_{\alpha_s} - \sqrt{C_{\alpha_s}^2 - C_{\alpha_{s0}}^2}\}^{-1}$$

$$C_{\alpha_{s0}}^2 = 1 - [(R_e + h)/R_s]^2$$ [Equation 18]

In this instance, a parameter r may be a value dependent on the earth curvature and may be referred to as, for example, the earth curvature parameter.

Also, a relationship in $S_{L_T}$ of a middle row between a matrix of Equation 15 and the expression $R_e$ of Equation 5 may be represented as shown in Equation 19.

$$S_{L_T} = R_s\left(S_{L_s} - \frac{\hat{R}_{GEOS,y}}{r}\right)/(R_e + h)$$ [Equation 19]

Since $S_{L_T}^2$ is multiplied by a small value in the expression $R_e$ of Equation 5, the expression $R_e$ of Equation 5, Equation 18, and Equation 19 may be calculated once or twice. In this instance, $R_e = R_{ee}$ may be initially set in Equations 18 and 19, which may be sufficient to obtain accurate values of $R_e$ and r. If $C_{\alpha_s}^2 < C_{\alpha_{s0}}^2$, $\sqrt{C_{\alpha_s}^2 - C_{\alpha_{s0}}^2}$ may be an imaginary number in Equation 18. In this example, an image pixel $(E_{LRF}, N_{LRF})$ may correspond to a point in a space external to the earth and a conversion of $(E_{GEOS}, N_{GEOS})$ may not be defined. To avoid this, $C_{\alpha_{s0}} = C_{\alpha_s}$ may be applied to Equation 18 such that Equation 20 may be derived from Equation 18.

$$r = \frac{1}{C_{\alpha_s}}, R_{IIRF} = R_s C_{\alpha_s}$$ [Equation 20]

To calculate the GEOS coordinates, Equations 21 and 22 may be used in an example of FIG. 4B.

$$\vec{R}_{IIRF0} = \vec{R}_{IIRF} + \Delta\vec{R}_S$$ [Equation 21]

$$\Delta\vec{R}_S = \vec{R}_S - \vec{R}_{S0} = \begin{bmatrix} R_sC_{L_s}S_{\Delta\lambda_s} \\ -R_sS_{L_s} \\ R_{so} - R_sC_{L_s}C_{\Delta\lambda_s} \end{bmatrix}$$ [Equation 22]

Also, $(E_{GEOS}, N_{GEOS})$ may be obtained using Equations 21 and 22 as illustrated in FIG. 4B, which may be expressed by Equations 23 and 24 as below.

$$\begin{bmatrix} C_{N_{GEOS}}S_{E_{GEOS}} \\ -S_{N_{GEOS}} \\ C_{N_{GEOAS}}C_{E_{GEOS}} \end{bmatrix} = \begin{bmatrix} \hat{R}_{GEOS0,x} \\ \hat{R}_{GEOS0,y} \\ \hat{R}_{GEOS0,z} \end{bmatrix} = \frac{\vec{R}_{IIRF} + \Delta\vec{R}_S}{|\vec{R}_{IIRF} + \Delta\vec{R}_S|}$$ [Equation 23]

$$E_{GEOS} = \text{Arc tan}\left[\frac{\hat{R}_{GEOS0,x}}{\hat{R}_{GEOS0,z}}\right]$$

$$N_{GEOS} = -\text{Arc sin } \hat{R}_{GEOS0,y}$$

$$Z = \begin{bmatrix} E_{GEOS} \\ N_{GEOS} \end{bmatrix}$$ [Equation 24]

Figure 5A:
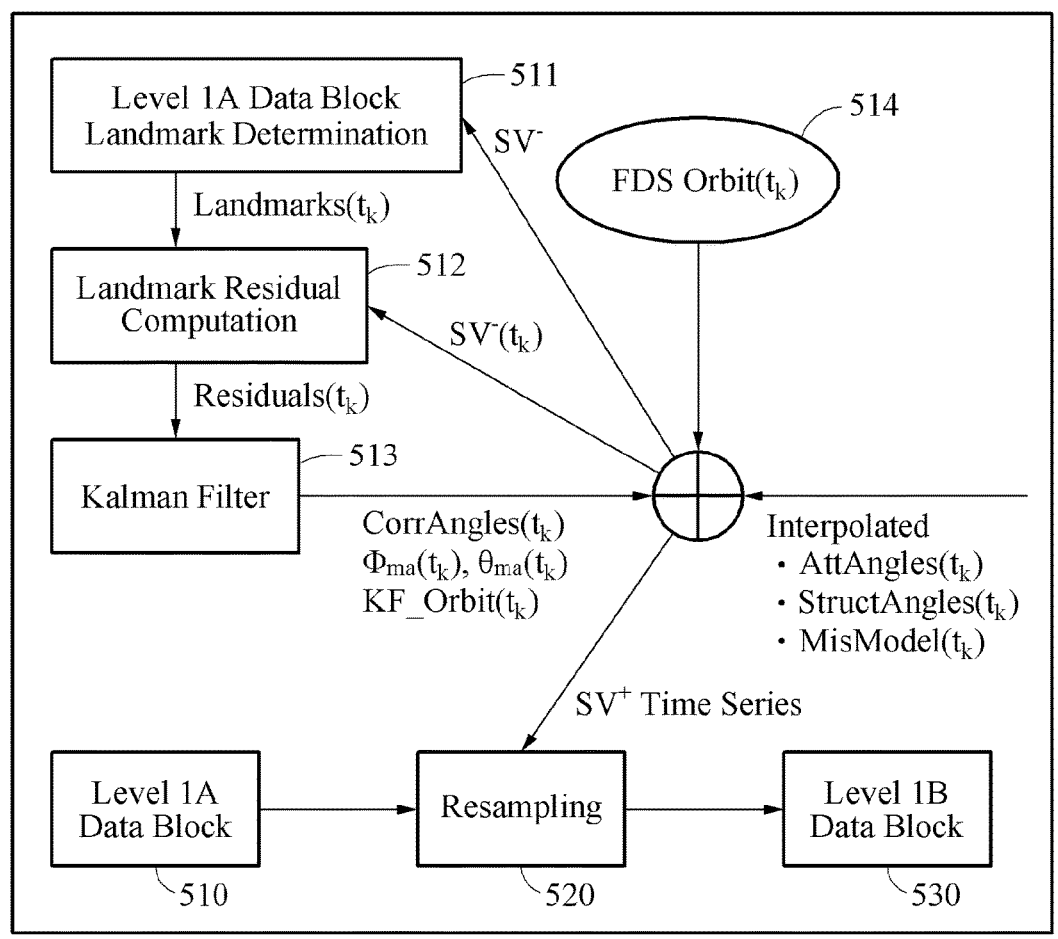
FIG. 5A and FIG. 5B are diagrams illustrating a procedure of processing a geometric correction of a satellite image using a Kalman filter according to an example embodiment.
Figure 5B:
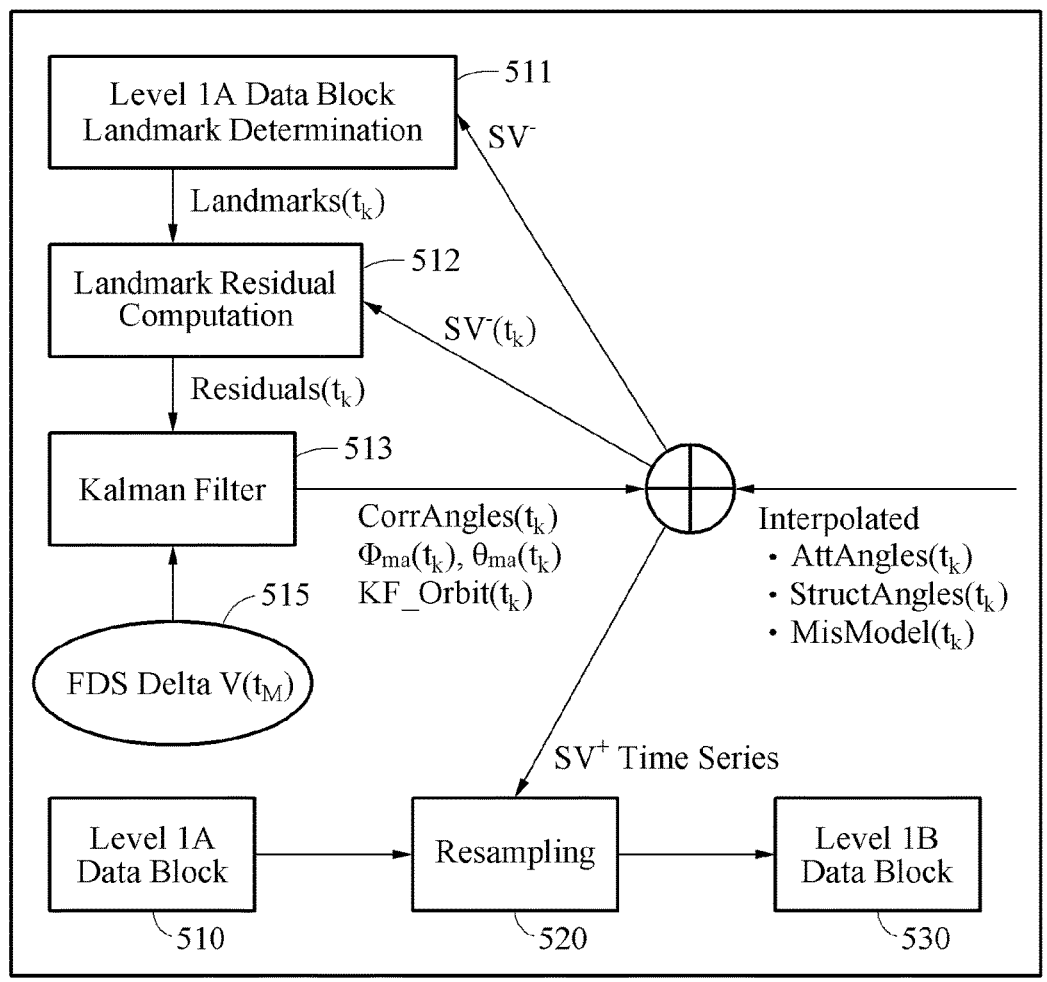

FIG. 5A and FIG. 5B are diagrams illustrating a procedure of processing a geometric correction of a satellite image using a Kalman filter according to an example embodiment. FIG. 5A illustrates a scheme of processing a geometric correction on a satellite image by additionally refining orbit information input from an external source to be high-accuracy orbit information, and FIG. 5B illustrates a scheme of processing a geometric correction on a satellite image by autonomously estimating the orbit information when the orbit information is not an input from an external source.

Referring to FIGS. 5A and 5B, the geometric correction of the satellite image may be performed by pixel-resampling on the level-1A data of a level-1A data block 510 based on the INR state vector in a resampling block 520 and generating the pixel-resampled level-1A data in a form of level-1B data through a level-1B data block 530. The level-1A data may be data obtained by processing a radiometric calibration on level-0 data, which is raw data received from the geostationary remote sensing satellite, to be a physical quantity determinable by a human being. The level-1A may be processed through a geometrical correction using the INR system.

When a landmark ($t_k$) corresponding to a landmark position of the level-1A data is selected in a landmark determination block 511, a landmark residuals ($t_k$) that is a difference between the landmark position and the actual landmark position corresponding to the landmark position may be calculated in a residual landmark computation block 512. A Kalman filter 513 may calculate a state vector to correct attitude, orbit, and payload misalignment errors associated with the level-1A data based on the calculated landmark residuals. As illustrated in FIG. 5A, when FDS orbit information 514 is input from an external source, Kalman filter orbit information may be calculated to additionally correct the orbit information based on the calculated landmark residuals. Also, a final state vector including a sum of the calculated Kalman filter orbit information and other state vector components obtained through a landmark tagged time-based interpolation may be calculated. As illustrated in FIG. 5B, when FDS delta V 515 is input instead of the FDS orbit information, the Kalman filter 513 may calculate Kalman filter orbit information to autonomously estimate the orbit information based on the landmark information. Also, a final state vector including a sum of the calculated Kalman filter orbit information and other state vector components obtained through a landmark tagged time-based interpolation may be calculated.

The INR state vector may be used to convert line of sight (LOS) reference frame (LRF) coordinates into GEOS coordinates as expressed by Equation 25.

$$SV_{INR} = [SV_{ma}^T \; SV_{corr}^T \; SV_{att}^T \; SV_{orb}^T]^T \quad \text{[Equation 25]}$$

Here, $SV_{ma}$ may be measured based on the IIRF misalignment error with respect to the LRF. Also, $SV_{corr}$, $SV_{att}$, $SV_{orb}$ may be measured based on $(\varphi_{corr}, \theta_{corr}, \Psi_{corr})$ corresponding to the attitude of the attitude control frame (ACF) with respect to the IIRF, $(\varphi_{att}, \theta_{att}, \Psi_{att})$ corresponding to the attitude of the orbit reference frame (ORF) with respect to the ACF, and $(\varphi_{orb}, \theta_{orb}, \Psi_{orb})$ corresponding to the attitude of the GEOS with respect to the ORF.

In the single mirror instrument in GEOS I-P, COMS, and MTSAT2 satellites, $SV_{ma}$ may be represented as shown in Equation 26, and a correction model and a payload misalignment error due to a thermal deformation may be represented as shown in Equation 27.

$$SV_{ma} = [\phi_{ma} \; \theta_{ma}]^T \quad \text{[Equation 26]}$$
$$= SV_{ma,model} + x_{ma}$$
$$SV_{ma,model} = [\phi_{ma,model} \; \theta_{ma,model}]^T$$

$$SV_{corr} = [\phi_{corr} \; \theta_{corr} \; \psi_{corr}]^T \quad \text{[Equation 27]}$$
$$= SV_{corr,model} + x_{corr}$$
$$SV_{corr,model} = [\phi_{corr,model} \; \theta_{corr,model} \; \psi_{corr,model}]^T$$

Here, $(x_{ma}, x_{corr})$ may be determined by the Kalman filter. Also, $SV_{att}$ and $SV_{orb}$ may be respectively represented by Equation 28 and Equation 29, and $SV_{ORF}$ for rotation may be represented as shown in Equation 30.

$$SV_{att} = [\phi_{att} \; \theta_{att} \; \psi_{att}]^T \text{ from telemetry} \quad \text{[Equation 28]}$$

$$SV_{orb} = [R_s \; \Delta\lambda_s \; L_s]^T \quad \text{[Equation 29]}$$
$$R_s = R_{so}\left(1 + \frac{\Delta R_s}{R_{so}}\right), \Delta\lambda_s = \lambda_s - \lambda_{so}$$

$$SV_{ORF} = [\phi_{orb} \; \theta_{orb} \; \psi_{orb}]^T \quad \text{[Equation 30]}$$

When having a satellite X-axis parallel with the equator similarly to the COMS satellite, $SV_{ORF}$ may be represented as shown in Equation 31. When having a satellite X-axis parallel with the orbit plane similarly to the GOES-I to M satellites, $SV_{ORF}$ may be represented as shown in Equation 32.

$$SV_{ORF} = [L_s \; \Delta\lambda_s \; 0]^T \quad \text{[Equation 31]}$$

$$SV_{ORF} = [L_s \; \Delta\lambda_s \; \dot{L}_s/\omega_e]^T \quad \text{[Equation 32]}$$
$$\left(\frac{\Delta R_s}{R_{so}}, \Delta\lambda_s, L_s, \dot{L}_s/\omega_e\right)$$

are the Kamel parameters initially used in the GOES-I to M satellites.

As illustrated in FIG. 5A, when FDS orbit information is received from an external source, the orbit information to be additionally refined by the Kalman filter may be represented as shown in Equation 33.

$$R_s = R_{so}\left[\frac{R_{FDS}}{R_{so}} + \frac{\delta R_s}{R_{so}}\right], \Delta\lambda_s = \Delta\lambda_{FDS} + \delta\lambda_s, \quad \text{[Equation 33]}$$
$$L_s = L_{FDS} + \delta L_s, \; \dot{L}_s = \dot{L}_{FDS} + \delta\dot{L}_s$$
$$\left(\frac{\delta R_s}{R_{so}}, \delta\lambda_s, \delta L_s, \delta\dot{L}_s\right) = \text{FDS orbit refinement by } KF.$$

As illustrated in FIG. 5B, when FDS delta V is received from an external source instead of the FDS orbit information, the orbit information to be acquired by the Kalman filter autonomously may be represented as shown in Equation 34.

$$\frac{\Delta R_s}{R_{so}} = \frac{\delta R_s}{R_{so}}, \Delta\lambda_s = \delta\lambda_s, L_s = \delta L_s, \dot{L}_s = \delta\dot{L}_s \quad \text{[Equation 34]}$$
$$\left(\frac{\delta R_s}{R_{so}}, \delta\lambda_s, \delta L_s, \delta\dot{L}_s\right) = \text{ideal orbit refinement by } KF.$$

A Kalman filter state vector $SV_{KF}$ (=x) may be used to determine the INR state vector $SV_{INR}$ as shown in Equation 35 below.

$$x = [x_{corr}^T \; \dot{x}_{corr}^T \; x_{orb}^T \; \dot{x}_{orb}^T \; x_{ma}^T \; \dot{x}_{ma}^T]^T \quad \text{[Equation 35]}$$
$$x_{corr} = [\delta\phi_{corr} \; \delta\theta_{corr} \; \delta\psi_{corr}]^T$$
$$\dot{x}_{corr} = [b_{\phi_{corr}} \; b_{\theta_{corr}} \; b_{\psi_{corr}}]^T = \text{constant}$$
$$x_{orb} = \left[\frac{\delta R_s}{R_{so}} \; \delta\lambda_s \; \delta L_s\right]^T$$
$$\dot{x}_{orb} = \left[\frac{\delta\dot{R}_s}{R_{so}} \; \delta\dot{\lambda}_s \; \delta\dot{L}_s\right]^T$$
$$x_{ma} = [\delta\phi_{ma} \; \delta\theta_{ma}]^T$$
$$\dot{x}_{ma} = [b_{\phi_{ma}} \; b_{\theta_{ma}}]^T = \text{constant}$$

When the Kalman filter is initiated, x may be set as $0_{12+2m}$.

Thereafter, the $SV_{INR}$ time series may be generated at a point separated by $\Delta t_i$ for a pixel-resampling and the image registration in the resampling block 520, and this may require an interpolation between $SV_{KF}$ time-series points determined using a landmark based on the attitude telemetering time-series point (for example, at an interval of 1 second), the FDS orbit, and $SV_{ma,model}$ and $SV_{corr,model}$ time-series points (for example, at an interval of 1 second). The $SV_{KF}$ time series among the measured values may be obtained using Equation 36.

$$x(t_i) = A(\Delta t_i) \; x(t_0), \; \Delta t_i = t_i - t_0, \; t_0 \le t_i \le t_1 \quad \text{[Equation 36]}$$

$$A(\Delta t_i) = \begin{bmatrix} A_{corr}(\Delta t_i) & 0_{6\times 6} & 0_{6\times 2m} \\ 0_{6\times 6} & A_{orb}(\Delta t_i) & 0_{6\times 2m} \\ 0_{2m\times 6} & 0_{2m\times 6} & A_{ma}(\Delta t_i) \end{bmatrix}$$

$$A_{corr}(\Delta t_i) = \begin{bmatrix} I_{3\times3} & I_{3\times3}\Delta t_i \\ 0_{3\times3} & I_{3\times3} \end{bmatrix}$$

$A_{orb}(\Delta t_i)$ may be obtained using Euler-Hill Equations as shown in Equation 37. When $\Delta t_i$ is a relatively small value, C=1 and S=γ=$\omega_e\Delta t_i$, which may be represented as shown in Equation 38 and Equation 39.

$$A_{orb}(\Delta t_i) = \begin{bmatrix} A_{11} & A_{12} \\ A_{21} & A_{22} \end{bmatrix} \quad \text{[Equation 37]}$$

$$A_{11} = \begin{bmatrix} (4-3C) & 0 & 0 \\ 6(S-\gamma) & 1 & 0 \\ 0 & 0 & C \end{bmatrix}$$

$$A_{12} = \begin{bmatrix} \omega_e^{-1}S & 2\omega_e^{-1}(1-C) & 0 \\ -2\omega_e^{-1}(1-C) & \omega_e^{-1}(4S-3\gamma) & 0 \\ 0 & 0 & \omega_e^{-1}S \end{bmatrix}$$

$$A_{21} = \begin{bmatrix} 3\omega_e S & 0 & 0 \\ 6\omega_e(C-1) & 0 & 0 \\ 0 & 0 & -\omega_e S \end{bmatrix}$$

$$A_{22} = \begin{bmatrix} C & 2S & 0 \\ -2S & (4C-3) & 0 \\ 0 & 0 & C \end{bmatrix}$$

$$C = \cos\gamma, S = \sin\gamma, \gamma = \omega_e\Delta t_i, \omega_e^{-1} = \frac{1}{\omega_e}$$

$$A_{orb}(\Delta t_i) = \begin{bmatrix} I_{3\times3} & I_{3\times3}\Delta t_i \\ 0_{3\times3} & I_{3\times3} \end{bmatrix} \quad \text{[Equation 38]}$$

$$A_{ma}(\Delta t_i) = \begin{bmatrix} I_{m\times m} & I_{m\times m}\Delta t_i \\ 0_{m\times m} & I_{m\times m} \end{bmatrix} \quad \text{[Equation 39]}$$

In the single mirror image instrument as in GEOS I-P, COMS, and MTSAT2 satellites, a value of m may be 2.

As described with reference to FIG. 3, the Kalman filter may use a single landmark at one time to determine the optimal a posteriori state vector and a covariance matrix estimation ($x_1^+$, $P_1^+$), and then may be re-initialized to perform a propagation between $t_0$ and $t_1$ and the estimation at $t_1$.

The initialization condition of the Kalman filter may be represented as shown in Equation 40 below.

$t_0$ = epoch time = $UTC_0$ at KF start. [Equation 40]

$x_0^+ = SV_{KF}$ at epoch = $0_{12+2m}$ $P_0^+$ = error covariance matrix at epoch =

$$\begin{bmatrix} P_{coor,0} & 0_{6\times6} & 0_{6\times2m} \\ 0_{6\times6} & P_{orb,0} & 0_{6\times2m} \\ 0_{2m\times6} & 0_{2m\times6} & P_{ma,0} \end{bmatrix}$$

$$P_{corr,0} = \sigma_{corr,0}^2 \begin{bmatrix} I_{3\times3} & 0_{3\times3} \\ 0_{3\times3} & 0_{3\times3} \end{bmatrix}, P_{orb,0} = \sigma_{orb,0}^2 \begin{bmatrix} I_{3\times3} & 0_{3\times3} \\ 0_{3\times3} & 0_{3\times3} \end{bmatrix}$$

$$P_{ma,0} = \sigma_{ma,0}^2 \begin{bmatrix} I_{m\times m} & 0_{m\times m} \\ 0_{m\times m} & 0_{m\times m} \end{bmatrix}$$

The Kalman filter may set various parameter values such that the calculated landmark residuals are minimized. Based on the set parameter values, the Kalman filter may estimate a state vector for correcting the attitude error and the orbit error, and the payload misalignment error of the level-1A data. When the information on the landmark is not available, a pre-estimated state vector value may be propagated. When the information on the landmark is available, a process of propagation, residual calculation, and estimation may be repetitively performed by the number of times corresponding to a total number of landmarks in the data.

The propagation may be an operation of propagating a priori state vector and a covariance matrix, which may be represented as shown in Equation 1.

The residual calculation may be an operation of calculating landmark residuals, which may be represented as shown in Equation 3. When a landmark residual calculation result is beyond a preset range, a re-initialization may be performed according to Equation 41, and then the process may be moved to a subsequent landmark instead of the estimation.

$(t_0,x_0^+,P_0^+)=(t_1,x_1^+,P_1^+)=(t_1,x_1^-,P_1^-)$ [Equation 41]

The estimation may indicate a measurement of a state vector at $t_1$, and may be calculated using Equation 42.

$K=P_1^- H^T(HP_1^- H^T+R)^{-1}$ $x_1^+ = x_1^- - K\Delta Z$ $P_1^+ = (I-KH)P_1^-(I-KH)^T + KRK^T$ [Equation 42]

Here, K is a (12+2 m)×2 matrix and H is a 2×(12+2 m) matrix. R is a 2×2 matrix. Each of P, A, I, and Q is a (12+2 m)×(12×2 m) matrix. I is a unit matrix. The correction angle, orbit, and misalignment errors at $t_1$ may be set as ($x_{corr}^+$, $x_{orb}^+$, $x_{ma}^+$)=($x_{corr}^-$, $x_{orb}^-$, $x_{ma}^-$) after a gradient adjustment with respect to a delta time until the subsequent landmark or a subsequent KF point. Thereafter, the Kalman filter may be re-initialized according to Equation 43.

$(t_0,x_0^+,P_0^+)=(t_1,x_1^+,P_1^+)$ [Equation 43]

Re-initialization at an end of data block time $UTC_{end}$ may be performed according to Equation 44.

$t_1 = UTC_{end}$ $\Delta t = t_1 - t_0$ $x_1^- = A(\Delta t)x_0^+$ $P_1^- = A(\Delta t)P_0^- A(\Delta t)^T + Q(\Delta t)$ $(t_0,x_0^+,P_0^+)=(t_1,x_1^+,P_1^+)=(t_1,x_1^-,P_1^-)$ [Equation 44]

When a maneuver delta V is provided by the FDS, the re-initialization performed at $UTC_{end}$ may be represented as shown in Equation 45, and the re-initialization of the Kalman filter may be performed according to Equation 46 as shown below.

$t_1 = UTC_{Maneuver}$ [Equation 45]

$\Delta t = t_1 - t_0$ $x_1^- = A(\Delta t)\, x_0^+$ $P_1^- = A(\Delta t)\, P_0^+ A(\Delta t)^T + Q(\Delta t)$ $x_1^+ = x_1^- + \Delta x$ $P_1^+ = P_1^- + \Delta P$ $\Delta x = \begin{bmatrix} 0_{1\times9} & \dfrac{\Delta v_{FDS,r}}{R_{so}} & \dfrac{\Delta v_{FDS,\lambda}}{R_{so}} & \dfrac{\Delta v_{FDS,L}}{R_{so}} & 0_{1\times2m} \end{bmatrix}^T$ $$(t_0, x_0^+, P_0^+) = (t_1, x_1^+, P_1^+) \quad \text{[Equation 46]}$$

When the FDS provides the orbit value instead of the delta V, the re-initialization performed at the orbit determination time $UT_{COD}$ may be represented as shown in Equation 47, and the re-initialization of the Kalman filter may be performed according to Equation 46.

$$t_1 = UTC_{OD} \quad \text{[Equation 47]}$$
$$\Delta t = t_1 - t_0$$
$$x_1^- = A(\Delta t) x_0^+$$
$$P_1^- = A(\Delta t) P_0^+ A(\Delta t)^T + Q(\Delta t)$$
$$x_1^+ = x_1^- + \delta x$$
$$P_1^+ = P_1^- + \delta P$$
$$\delta x = \begin{bmatrix} 0_{1\times 6} & \delta\left(\frac{\Delta R_s}{R_{so}}\right) & \delta\Delta\lambda_s & \delta L_s & 0_{1\times(3+2m)} \end{bmatrix}^T$$
$$(\delta\Delta R_s, \delta\Delta\lambda_s, \delta L_s) = (R_{FDS}, \Delta\lambda_{FDS}, L_{FDS})^- \text{ before } OD$$
$$- (R_{FDS}, \Delta\lambda_{FDS}, L_{FDS})^+ \text{ after } OD$$
$$\delta P = \text{diagonal terms 7 to 9 from } OD \text{ error analysis.}$$

A processing of a process noise covariance matrix Q may be performed as shown in Equations 48 and 49. Through this, Equation 50 may be obtained.

$$Q(\Delta t) = V_0 + V\Delta t + \frac{1}{2}[F_x V + V F_x^T]\Delta t^2 + \frac{1}{3} F_x V F_x^T \Delta t^3 \quad \text{[Equation 48]}$$

$$V_0 = \begin{bmatrix} V_{corr,0} & 0_{6\times 6} & 0_{6\times 2m} \\ 0_{6\times 6} & V_{orb,0} & 0_{6\times 2m} \\ 0_{2m\times 6} & 0_{2m\times 6} & V_{ma,0} \end{bmatrix}, V_{y,0} = \begin{bmatrix} \sigma_{e,y}^2 I_{3\times 3} & 0_{3\times 3} \\ 0_{3\times x} & 0_{3\times 3} \end{bmatrix}$$

$$V = \begin{bmatrix} V_{corr} & 0_{6\times 6} & 0_{6\times 2m} \\ 0_{6\times 6} & V_{orb} & 0_{6\times 2m} \\ 0_{2m\times 6} & 0_{2m\times 6} & V_{ma} \end{bmatrix}, V_y = \begin{bmatrix} \sigma_{v,y}^2 I_{3\times 3} & 0_{3\times 3} \\ 0_{3\times 3} & \sigma_{u,y}^2 I_{3\times 3} \end{bmatrix}$$

Where,
y=corr, orb, or ma. For ma, 3 replaced by n.
$\sigma_e$=measurement white noise standard deviation, rad.
$\sigma_v$=random walk standard deviation, $rad/sec^{1/2}$.
$\sigma_u$=rate random walk standard deviation, $rad/sec^{3/2}$.

$$F_x = \begin{bmatrix} F_{corr} & 0_{6\times 6} & 0_{6\times 2m} \\ 0_{6\times 6} & F_{orb} & 0_{6\times 2m} \\ 0_{2m\times 6} & 0_{2m\times 6} & F_{ma} \end{bmatrix}, F_{corr} = \begin{bmatrix} 0_{3\times 3} & I_{3\times 3} \\ 0_{3\times 3} & 0_{3\times 3} \end{bmatrix} \quad \text{[Equation 49]}$$

$F_{orb}$ from Euler-Hill equations $$F_{orb} = \begin{bmatrix} 0_{3\times 3} & I_{3\times 3} \\ \omega_e^2 F_{21} & 2\omega_e F_{22} \end{bmatrix} \cong \begin{bmatrix} 0_{3\times 3} & I_{3\times 3} \\ 0_{3\times 3} & 0_{3\times 3} \end{bmatrix}$$

$$F_{21} = \begin{bmatrix} 3 & 0 & 0 \\ 0 & 0 & 0 \\ 0 & 0 & -1 \end{bmatrix},$$

$$F_{22} = \begin{bmatrix} 0 & 1 & 0 \\ -1 & 0 & 0 \\ 0 & 0 & 0 \end{bmatrix}, F_{ma} = \begin{bmatrix} 0_{m\times m} & I_{m\times m} \\ 0_{m\times m} & 0_{m\times m} \end{bmatrix}$$

$$Q(\Delta t) = \begin{bmatrix} Q_{corr} & 0_{6\times 6} & 0_{6\times 2m} \\ 0_{6\times 6} & Q_{orb} & 0_{6\times 2m} \\ 0_{2m\times 6} & 0_{2m\times 6} & Q_{ma} \end{bmatrix} \quad \text{[Equation 50]}$$

$$Q_y = \begin{bmatrix} \left(\sigma_{e,y}^2 + \sigma_{v,y}^2 \Delta t + \frac{1}{3}\sigma_{u,y}^2 \Delta t^3\right) I_{3\times 3} & \frac{1}{2}\sigma_{u,y}^2 \Delta t^2 I_{3\times 3} \\ \frac{1}{2}\sigma_{u,y}^2 \Delta t^2 I_{3\times 3} & \sigma_{u,y}^2 \Delta t I_{3\times 3} \end{bmatrix}$$

Where,
y=corr, orb, or ma. For ma, $I_{3\times 3}$ is replaced by $I_{m\times m}$.

A sigma value may be calculated based on a time measurement between measured values, an analysis on the error of $SV_{INR}$, and Equation 50.

A landmark measurement noise covariance matrix R may be represented as shown in Equation 51. In this instance, $\sigma_M$ is sigma measurement noise calculated through a landmark information error analysis.

$$R_k = \sigma_M^2 I_{2\times 2} \quad \text{[Equation 51]}$$

A landmark location sensitivity matrix H may be determined using $$\left(\frac{\partial Z}{\partial x}\right)_{x=0},$$

Z being a landmark value measured using a linear expression of $C_{IIRF}^{GEOS}$. When a satellite X axis parallel to the equator is provided similarly to a COMS satellite, the landmark location sensitivity matrix H corresponding to a 2×(12+2 m) matrix may be represented as shown in Equation 52.

$$H = [H_{corr} \; H_{orb} \; H_{ma}] \quad \text{[Equation 52]}$$

Where, $$H_{corr} = -\begin{bmatrix} T_N S_E & 1 & T_N C_E & 0_{1\times 3} \\ C_E & 0 & -S_E & 0_{1\times 3} \end{bmatrix}$$

$$H_{orb} = -\begin{bmatrix} 0 & 1 & T_N S_E & 0_{1\times 3} \\ 0 & 0 & C_E & 0_{1\times 3} \end{bmatrix} +$$

$$\bar{r}\begin{bmatrix} \frac{S_E}{C_N} & \frac{C_E}{C_N} & 0 & 0_{1\times 3} \\ C_E S_E & -S_E S_N & C_N & 0_{1\times 3} \end{bmatrix}$$

$$\bar{r} = \left(C_{\alpha_s} - \sqrt{C_{\alpha_s}^2 - 1 + ((R_e + h)/R_{so})^2}\right)^{-1}$$

$$C_{\alpha_s} = \cos\bar{\alpha}_s = C_N C_E$$

$$T_N = \tan \bar{N}_{GEOS}, S_N = \sin \bar{N}_{GEOS}, C_N = \cos \bar{N}_{GEOS}$$

$$S_E = \sin \bar{E}_{GEOS}, C_E = \cos \bar{E}_{GEOS}$$

($\bar{E}_{GEOS}$, $\bar{N}_{GEOS}$) represent a landmark position in Equation 24, $R_e$ denotes the earth radius at the landmark in Equation 5, and h is a height of the landmark.

When a satellite X axis parallel to the orbit plane is provided similarly to a GEOS I-M satellite, $$\begin{bmatrix} 0 & 1 & T_N S_E & 0_{1\times 3} \\ 0 & 0 & C_E & 0_{1\times 3} \end{bmatrix}$$

may be replaced by $$\begin{bmatrix} 0 & 1 & T_N S_E & 0_{1\times 2} & T_N C_E/\omega_e \\ 0 & 0 & C_E & 0_{1\times 2} & -S_E/\omega_e \end{bmatrix}.$$

$H_{ma}$ may be calculated in the single mirror image instrument in GEOS I-P, COMS, and MTSAT2 satellites using Equation 53.

$$H_{ms} = \begin{bmatrix} C_{11} & C_{12} & 0 & 0 \\ C_{21} & C_{22} & 0 & 0 \end{bmatrix} \quad \text{[Equation 53]}$$

$$C_{11} = -\frac{C_{22}}{C_N}, \; C_{12} = \frac{C_{21}}{C_N},$$

$$C_{21} = \frac{S_E - C_N}{1 - C_N S_E}, \; C_{22} = \frac{S_N C_N}{1 - C_N S_E}$$

In this disclosure, the technological core may be the employment of Euler-Hill equation in the orbit modeling and the derivation of the landmark location sensitivity matrix, that is, the matrix H. It is understood that the matrix H represents components including the attitude, for example, the correction angle, the orbit, and the payload misalignment being physically distributed from a single landmark measurement value.

Figure 6:
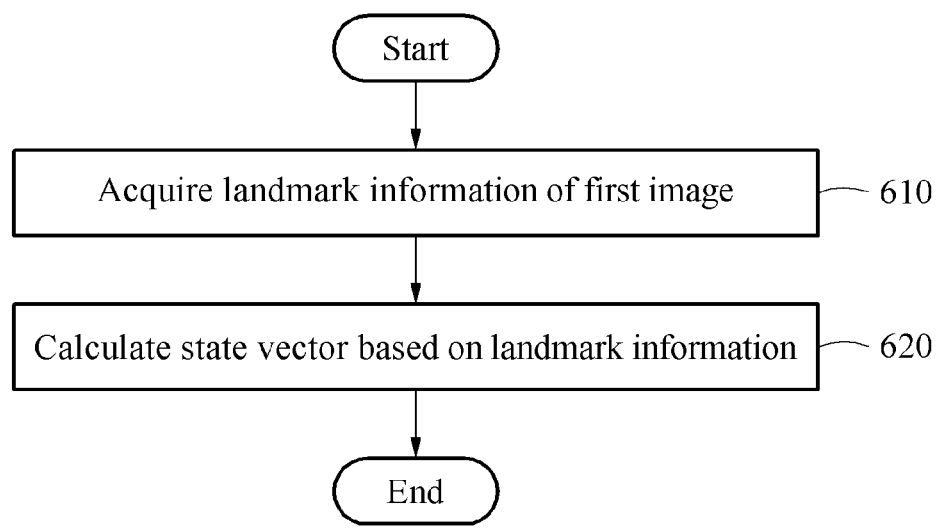
FIG. 6 is a flowchart illustrating a method of geometrically correcting an image from a geostationary remote sensing satellite according to an example embodiment.

FIG. 6 is a flowchart illustrating a method of geometrically correcting an image from a geostationary remote sensing satellite according to an example embodiment.

An apparatus for geometrically correcting an image from a geostationary remote sensing satellite may process a geometric correction on an image captured from an observation satellite located on a stationary satellite and perform a method of correcting a geometric distortion in an image from a geostationary remote sensing satellite based on landmark information.

In operation 610, a landmark determination part of the apparatus for geometrically correcting an image from a geostationary remote sensing satellite may acquire landmark information associated with a first image. The first image may be a level-1A image obtained by performing a radiometric calibration on a level-0 image received from a geostationary remote sensing satellite. A preprocessing procedure may be performed in advance of operation 610. In operation 610, the landmark determination part may select a first position of at least one landmark from the first image and calculate a difference between the selected first position and a second position that is the actual landmark position corresponding to the first position. Here, the first position may be acquired by referencing a prestored landmark catalog. The landmark determination part may acquire landmark information based on a calculation result.

In operation 620, a navigation filter of the apparatus for geometrically correcting an image from a geostationary remote sensing satellite may calculate a state vector for correcting at least one of the attitude error, the orbit error, and the payload misalignment error with respect to the first image based on the landmark information acquired in operation 610. In this instance, the navigation filter may calculate the state vector using a Kalman filter algorithm. The calculated state vector may include correction information associated with the amount of correction to be performed on the first image in units of pixel.

In operation 620, the navigation filter may receive the orbit information associated with the first image from an external element such as FDS and an on-board GPS. In this example, the navigation filter may calculate a Kalman filter orbit component to additionally refine the orbit information based on the landmark information and calculate the state vector including the calculated Kalman filter orbit component. Furthermore, even when the orbit information is not input from the external element, the navigation filter may autonomously estimate the orbit information associated with the first image using the calculated Kalman filter orbit information based on the landmark information, and calculate the state vector including the estimated orbit information.

After operation 610, a resampler of the apparatus for geometrically correcting an image from a geostationary remote sensing satellite may resample at least one pixel position of the first image based on correction information of the state vector calculated in operation 620. Through such resampling, the first image may be corrected to be a level-1B-type image.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. An apparatus for geometrically correcting an image from a geostationary remote sensing satellite, the apparatus comprising:
    a landmark determination part configured to acquire landmark information associated with a first image captured by a geostationary remote sensing satellite; and
    a navigation filter configured to calculate a state vector for processing a geometric correction on the first image by correcting at least one of an attitude error, an orbit error, and a payload misalignment error associated with the first image based on the landmark information;
    wherein when the navigation filter does not receive an input of orbit information from an outside source, the navigation filter is configured to autonomously estimate orbit information associated with the first image using Kalman filter orbit information, wherein the Kalman filter orbit information is calculated based on the landmark information, and wherein the navigation filter is configured to calculate the state vector including the estimated orbit information.

2. The apparatus of claim 1, wherein the landmark determination part is configured to select a first position of at least one landmark from the first image, calculate a difference between the selected first position and a second position, and acquire the landmark information based on a result of the calculating, the second position being an actual landmark position corresponding to the first position.

3. The apparatus of claim 1, further comprising:
a preprocessor configured to generate the first image by performing a radiometric calibration on an image received from a geostationary remote sensing satellite.

4. The apparatus of claim 1, wherein the navigation filter is configured to calculate the state vector using a Kalman filter algorithm.

5. The apparatus of claim 1, wherein when the orbit information is an input from an outside source, the navigation filter is configured to additionally refine the orbit information using Kalman filter orbit information that is calculated based on the landmark information, and calculate the state vector including the additionally refined orbit information.

6. The apparatus of claim 1, further comprising:
a resampler configured to resample pixel positions of the first image based on the calculated state vector.

7. A method of geometrically correcting an image from a geostationary remote sensing satellite, the method comprising:
acquiring landmark information associated with a first image, the first image captured by a geostationary remote sensing satellite; and
calculating a state vector for processing a geometric correction on the first image by correcting at least one of an attitude error, an orbit error, and a payload misalignment error associated with the first image based on the landmark information;
wherein when orbit information is not received from an outside source, the calculating the state vector includes estimating orbit information associated with the first image using Kalman filter orbit information that is calculated based on the landmark information and calculating the state vector including the estimated orbit information.

8. The method of claim 7, further comprising:
preprocessing for generating the first image by performing a radiometric calibration on an image received from a geostationary remote sensing satellite.

9. The method of claim 7, wherein the acquiring of the landmark information includes selecting a first position of at least one landmark from the first image, calculating a difference between the selected first position and a second position, and acquiring the landmark information based on a result of the calculating, the second position being an actual landmark position corresponding to the first position.

10. The method of claim 7, wherein when the orbit information is an input from an outside source, the calculating of the state vector includes additionally refining the orbit information using Kalman filter orbit information that is calculated based on the landmark information and calculating the state vector including the additionally refined orbit information.

11. The method of claim 7, wherein the calculating of the state vector includes calculating the state vector using a Kalman filter algorithm.

12. The method of claim 7, further comprising:
resampling pixel positions of the first image based on the calculated state vector.

13. A non-transitory computer-readable medium storing program instructions for controlling a processor to perform a method of geometrically correcting an image from a geostationary remote sensing satellite, the method comprising:
acquiring landmark information associated with a first image, the first image captured by a geostationary remote sensing satellite; and
calculating a state vector for processing a geometric correction on the first image by correcting at least one of an attitude error, an orbit error, and a payload misalignment error associated with the first image based on the landmark information;
wherein when orbit information is not received from an outside source, the calculating the state vector includes estimating orbit information associated with the first image using Kalman filter orbit information that is calculated based on the landmark information and calculating the state vector including the estimated orbit information.

14. The non-transitory computer-readable medium of claim 13, wherein the method further comprising:
preprocessing for generating the first image by performing a radiometric calibration on an image received from a geostationary remote sensing satellite.

15. The non-transitory computer-readable medium of claim 13, wherein the acquiring of the landmark information includes selecting a first position of at least one landmark from the first image, calculating a difference between the selected first position and a second position, and acquiring the landmark information based on a result of the calculating, the second position being an actual landmark position corresponding to the first position.

16. The non-transitory computer-readable medium of claim 13, wherein when the orbit information is an input from an outside source, the calculating of the state vector includes additionally refining the orbit information using Kalman filter orbit information that is calculated based on the landmark information and calculating the state vector including the additionally refined orbit information.

17. The non-transitory computer-readable medium of claim 13, wherein the calculating of the state vector includes calculating the state vector using a Kalman filter algorithm.

* * * * *